United States Patent Office 3,284,366
Patented Nov. 8, 1966

3,284,366
PROCESS OF MAKING SEAWATER
DESALTING BRIQUETS
Calvin Calmon, Springfield Township, Burlington County, and William Allen, Jr., Birmingham, N.J., assignors to Ritter Pfaudler Corporation, a corporation of New York
No Drawing. Filed Feb. 18, 1965, Ser. No. 433,797
3 Claims. (Cl. 252—179)

This invention relates to seawater desalting chemicals, and more particularly to a process of forming such chemicals into highly compressed briquets for use in seawater desalting kits. The present application is a continuation-in-part of our application Serial No. 223,546, filed September 13, 1962, now abandoned, which in turn was a continuation-in-part of our application Serial No. 64,729, filed October 25, 1960, now abandoned.

One particular type of kit that has been used successfully includes the desalting chemicals in the form of briquets of convenient size, and a plastic bag of the type shown in Pick Patent 2,643,771, dated June 30, 1953. On a dry basis the principal component of such briquets is 85 to 99.4 percent cation exchange material in the silver form consisting of 30 to 99.5 percent silver alumino silicate and 0.5 to 70 percent water insoluble silver cation exchange resin. This resin is selected from the group consisting essentially of sulfonated or phosphonated styrene-divinyl benzene copolymer, phenol, formaldehyde copolymer, and a carboxylic type copolymer prepared from acrylics and divinyl benzene, each treated with silver nitrate solution. The aforesaid alumino silicate and resin are equivalents in the manner in which they react to desalt seawater, but there are some important differences between them. The alumino silicate has a higher exchange capacity of about 3.6 meq. per gram and does not absorb much water. The resin, on the other hand has a somewhat lower exchange capacity of about 3.0 meq. per gram and when immersed in the dry condition in water absorbs an appreciable amount of water and thereby swells up. This property of swelling is used to cause the highly compressed briquets to disrupt and break up when they are placed in seawater during use. Such disruption is more rapid the higher the proportion of resin in the briquet. However, since the exchange capacity of the resin is somewhat lower than that of the alumino silicate and since it also slightly reduces the quantity of water available for use because of the water absorbed in swelling it is best to limit the amount of resin in the mixture of silver cation exchange material to approximately 2 percent which provides an adequately short disruption time of the order of 3 to 4 minutes. The mixture of chemicals includes also 0.5 to 3.0 percent stearic acid serving as a lubricant in the briquetting operation, an absorbent such as 0.1 to 2.0 percent activated carbon to improve the taste of the desalted water and, sometimes, 0 to 10 percent barium hydrate, but the latter is a dispensible ingredient; it serves to reduce sulfate and magnesium in the desalted seawater, and may be omitted when such reduction is not needed. A suitable composition of the desalting chemicals is disclosed in the Wood Patent 2,600,719, dated June 17, 1952.

Desalting kits as described above have been highly succuessful commercially. Military and civil aircraft flying ocean routes carry such desalting kits as standard equipment for use in emergencies. It is, therefore, important that both weight and volume of the kits are as low as possible. In order to achieve small volume, the chemical components for the briquets are mixed in finely granulated form and then compressed in a mold under high pressures of the order of 12 to 16 tons per square inch. However, the moisture content of the desalting chemicals has presented a problem which prior to our invention had not been solved in an entirely satisfactory manner but which is solved by the present invention.

It is desirable to keep the moisture content of the briquets as low as possible because any moisture present not only increases the weight of the briquets but also tends to reduce their useful life. This is due to the fact that in the presence of appreciable moisture certain of the ingredients react in the course of time and thus lose some of their effectiveness, especially when the kits are stored at relatively high temperatures which is often unavoidable. On the other hand, any attempt in the past to briquet the components in the completely dried state has failed to produce satisfactorily strong briquets; with a moisture content of less than 2 or 3 percent the briquets were relatively fragile, so that on removal from the mold pieces broke off and laminations formed, making it difficult or impossible to handle them and to place the required moisture-proof wrapper around them. Thus, it has been the practice to compress briquets to an average thickness of about 0.44 inch. When the mixture of desalting chemicals was completely dry the thickness increased to about 0.46 inch immediately upon removal from the mold subsequent to briquetting, laminer cracks developed and the briquets were fragile; when wrapped immediately after briquetting in moisture resistant material and stored for several weeks the thickness gradually increased further to about 0.48 inch and the laminar cracks became more noticeable. On the other hand, when the mixture of desalting chemicals contained 3 to 7 percent moisture with all other conditions identical the briquets on removal from the mold were relatively strong and free of cracks and had a thickness of about 0.44 inch. They retained their strength, freedom of cracks and thickness even in prolonged storage. Consequently, it has been necessary in the past to compromise with regard to the moisture content by making it high enough to obtain briquets of sufficient strength for handling, yet low enough so as to minimize deterioration in the course of time. In line with this compromise, it has been the practice to briquet the mixture of components with a moisture content of about 3 to 7 percent. Such rather wide range in the moisture content was found necessary because in practice with commercial production it was impossible to maintain the moisture content within closer tolerances.

It has been observed that in the course of time the quality of briquets having such moisture content deteriorates gradually. Briquet quality is determined by treating a fixed quantity of standard synthetic seawater with a briquet and then analyzing the treated water. It has been found that maintaining briquets at an elevated temperature for a relatively short period of time is equivalent to natural aging during a longer period. Specifically, a procedure, hereinafter referred to as "accelerated aging," consists of heating the wrapped briquets to a temperature of 75° C. and maintaining it at this temperature for a period of 120 days. This procedure has the same effect on the quality of briquets as storage under ordinary uncontrolled conditions for six years.

A typical composition of desalting briquets on a dry basis as described in said Wood Patent 2,600,719, is as follows:

| | Percent |
|---|---|
| Silver alumino silicate | 91.5 |
| Silver cation exchange resin (sulfonated styrene-divinyl benzene copolymer treated with silver nitrate solution) | 1.9 |
| Stearic acid | 1.2 |
| Activated carbon | 0.3 |
| Barium hydrate | 5.1 |
| Total | 100.0 |

The following tabulation shows the analytical results obtained on seawater treated with briquets of such composition from a batch manufactured prior to this invention. These briquets weighed 70 grams each and had a moisture content of 6.3 percent. With the exception of the pH value, the results are given in terms of parts per million as $CaCO_3$. The United States Government purchases substantial quantities of seawater desalting kits including such briquets for use by the armed forces, in accordance with Specification MIL–D–5531B, dated May 1, 1957. For purposes of comparison, the last column of this tabulation gives the maximum values permitted under this specification:

|  | Tested Immediately | Tested after Accelerated Aging | Specification |
| --- | --- | --- | --- |
| pH | 10.2 | 9.1 | 10.5 |
| Chloride | 2,140 | 3,180 | 2,750 |
| Sulfate | 1,000 | 1,550 | 1,350 |
| Methyl Orange Alkalinity | 142 | 360 | 350 |
| Total Hardness | 38 | 1,320 | 310 |

These test results clearly show the deterioration of the briquets due to aging. While the "fresh" briquet met the specification in all respects, the "aged" briquet failed to do so. Such deterioration in the course of time is, of course, most undesirable. As has been pointed out, the briquets are emergency equipment for use when airplanes are forced down at sea. Such equipment is usually stored in warehouses or carried on airplanes for prolonged periods of time, but should be in prime operating condition when an emergency makes its use necessary. Because of the deterioration in the course of time desalting kits made prior to this invention are replaced at considerable expense after they have reached a certain age.

It is the object of this invention to provide a process for making seawater desalting briquets which have high physical strength, low moisture content, high capacity in desalting seawater, and good resistance to deterioration in the course of time.

We have made the surprising discovery that the foregoing object is achieved if the mixed components for seawater desalting briquets are dried as completely as is practical and brought to an elevated temperature in the range of 70° C. to 200° C., and then placed in a press and briquetted while the temperature is maintained in such range. This temperature range is above the melting point of the stearic acid which was included in the mixture of desalting chemicals as a lubricant in the briquetting operation. In the molten condition the stearic acid, even in the relatively small proportion stated above, becomes a binder which is an entirely unexpected result and makes possible the production of excellent briquets without moisture. Within this temperature range of 70° C. to 200° C. none of the ingredients other than stearic acid melt, become plastic or are charred. In order to provide some margin of safety we prefer to use actual heating temperatures of 80° C. or higher. The upper limit of the stated range, 200° C. is the temperature above which relatively rapid disintegration of some of the briquet components occurs. There is no minimum limit for the time during which the mixture need be maintained at the elevated temperature, except that it is necessary to insure that all particles of the mixture are brought to the elevated temperature prior to briquetting. In the customary batch operation this takes about 5 to 10 minutes, but such time can be reduced by making the batches small, or by speading the mixture out during heating in a very thin layer, or by heating the mixture in a continuously flowing stream. At temperatures up to about 110° C. there appears to be no maximum limit for the time during which the mixture may be maintained at the elevated temperature prior to briquetting. Thus, a mixture may be maintained at an elevated temperature up to about 110° C. for a week and longer without noticeable effect on the quality of the briquets subsequently produced from it, although maintenance of the elevated temperature for so long a period generally serves no useful purpose and is usually costly and inconvenient. At temperatures above 110° C., however, optimum briquet quality is not obtained if the mixture is maintained at the elevated temperature for too long a time. Such effect on the quality of the briquets becomes noticeable if the mixture is maintained at 200° C. for more than about 4 minutes. It is interesting in this connection that heating alone for a longer time does not affect the chemical properties of the mixture so much. Thus, a batch of the same type of mixture was maintained at 200° C. for four hours and then tested without briquetting. The composition of the treated seawater obtained in this test showed that the quality of the mixture had not been impaired. However, when the mixture is briquetted after having been maintained at 200° C. for four hours the quality of the briquets so obtained is impaired appreciably.

Thus, satisfactory results in accordance with our invention may be obtained with heating temperatures in the range of 110° C. to 200° C. if the heating time is limited to 4 minutes. However, this time may be extended at temperatures below 200° C., and it may be extended more the lower the temperature is. Just above 110° C., the mixture may be heated for several days without significant impairment of briquet quality. Therefore, if it is desired to use some specific heating temperature in the range of 110° C. to 200° C., and if it is, furthermore, desired to extend the heating time beyond 4 minutes, tests should be made to determine the maximum heating time which may be used at such specific temperature without impairment of briquet quality.

In view of all the foregoing we prefer to heat the mixture prior to briquetting to a temperature in the range of 80° C. to 110° C. and to maintain the temperature in this range until the mixture is briquetted. With this procedure uniformly satisfactory briquets of excellent stability are obtained without any need to be concerned about the length of time the mixture is maintained at the elevated temperature.

In order to achieve the full benefits of our invention it is necessary to dry the mixture as completely as practical. This is best done under conditions of pressure and temperature corresponding to the boiling point of water, under a vacuum at ordinary temperatures or under higher pressure at elevated temperatures. The ingredients may be dried before mixing, or the mixture may be dried before it is heated prior to briquetting, but either of these methods requires that the dried material be kept between drying and heating in such a manner that pickup of moisture from the atmosphere is prevented. Such prevention is unnecessary if drying and heating are combined in one operation, and we consider this combination preferable because it is simpler and more convenient. A satisfactory way of combining drying and heating is to spread the mixture on flat open trays which are placed in a dryer in which air of about 100° C. is circulated around the trays at atmospheric pressure until all free moisture has been driven off and the moisture content of the mixture has been reduced to less than one percent. The length of time needed to achieve such drying varies, depending upon the thickness of the layer of mixture on the trays, the nature of air circulation, and the construction of the dryer. However, since the mixture may be maintained at about 100° C. for a prolonged period without harm we have found it most satisfactory and convenient to place the mixed components in a dryer maintained at about 100° C., and leave them there until the next work day. Thus, the mixture will remain in the dryer for about 14 hours or somewhat longer during the week, or several days if a weekend or holidays intervene. This allows a large safety margin in the drying time. On removal from the dryer the mixture which now has a moisture content of less than one percent is immediately transferred to the hopper of a press and briquetted by compressing appropriate quantities of the mixture in a mold under a pressure of about 12 to 16 tons per square inch. In this manner the mixture is not permitted to cool off appreciably prior to briquetting, but if desired, additional heat may be applied to the mixture by heating elements placed in or adjacent to the hopper of the press to compensate for any heat losses and maintain the temperature of the mixture in the range of 80° C. up to the time the mixture is briquetted. On leaving the press the briquets are placed as rapidly as possible in moisture-proof wrappers to prevent pick-up of moisture from the atmosphere.

The following tabulation shows the results obtained when testing "new" briquets made in accordance with this invention by following the last described procedure. The mixture had been in the dryer at 100° C. over a weekend, some 60 hours. The test procedure was exactly the same as that described above for "old" briquets made prior to this invention. The composition of the briquets on a dry basis was the same in both test series. The net weight of each briquet on a dry basis was also substantially the same although each "new" briquet weighed only 66 grams because it had a much lower moisture content of less than one percent.

|  | Tested Immediately | Tested after Accelerated Aging | Specification |
| --- | --- | --- | --- |
| pH | 10.2 | 9.9 | 10.5 |
| Chloride | 1,760 | 1,820 | 2,750 |
| Sulfate | 900 | 1,000 | 1,350 |
| Methyl Orange Alkalinity | 124 | 162 | 350 |
| Total Hardness | 54 | 96 | 310 |

These results show that there was no significant change in quality due to accelerated aging, that the "fresh" as well as the "aged" briquets met the specification comfortably in all respects. A comparison of these results with those described with "old" briquets made prior to this invention shows that in the "fresh" condition the quality was substantially the same (the differences being of magnitudes such as occur normally from batch to batch) although the "new" briquet weighed substantially less because of the lower moisture content. Other similar briquets made in accordance with our invention have been tested after actual storage for about 3 years at varying temperatures, and retained their original thickness of about 0.44 inch, their strength and their freedom of laminar cracks during such storage. Furthermore, their quality was found unimpaired, confirming the results obtained with accelerated aging.

Briquets have also been made in accordance with our invention with the ingredients as given in the above tabulation except that the barium hydrate was omitted from the mixture. They were likewise found to have and retain the same satisfactory physical and chemical properties as briquets made with barium hydrate, except that they do not provide the reduction of the sulfate and magnesium content of the water treated with them which is obtained when barium hydrate is included in the mixture.

Thus, briquets made in accordance with our invention have good resistance to deterioration in the course of time. Their other properties are also excellent: they weigh less, have a moisture content of less than one percent and are dense, occupying relatively small volume. They are physically strong so that they can be handled without becoming damaged, yet disrupt rapidly when placed in seawater.

While we have described what we consider the best way of practicing our invention, modifications may be made without departing from its spirit, and reference is, therefore, made to the appended claims for a definition of the scope of our invention.

What we claim is:

1. The process of making desalting briquets from a mixture of granulated components consisting of 85 to 99.4 percent cation exchange material in the silver form which in turn consists of 30 to 99.5 percent silver alumino silicate and 0.5 to 70 percent water insoluble silver cation exchange resin selected from the group consisting of sulfonated styrene-divinyl copolymer, phosphonated styrene-divinyl copolymer, phenol formaldehyde copolymer, and a carboxylic type copoylmer prepared from acrylics and divinyl benzene, each treated with silver nitrate solution, 0.5 to 3.0 percent stearic acid, 0.1 to 2.0 percent activated carbon and 0 to 10 percent barium hydrate, which process comprises drying said mixture to a moisture content of less than 1 percent and bringing it to an elevated temperature in the range of 70° C. to 200° C., limiting the time during which the mixture is maintained at said elevated temperature when said elevated temperature is above 110° C. to 4 minutes at 200° C. and to a period which may be lengthened beyond 4 minutes if said elevated temperature is below 200° C., to an indefinite period if said elevated temperature is below 110° C., and then compressing said mixture under pressure sufficient to form stable briquets while said mixture is maintained at a temperature of 70° C. to 200° C.

2. The process of making desalting briquets from a mixture of granulated components consisting of 85 to 99.4 percent cation exchange material in the silver form which in turn consists of 30 to 99.5 percent silver alumino silicate and 0.5 to 70 percent water insoluble silver cation exchange resin selected from the group consisting of sulfonated styrene-divinyl copolymer, phosphonated styrene-divinyl copolymer, phenol formaldehyde copolymer, and a carboxylic type copolymer prepared from acrylics and divinyl benzene, each treated with silver nitrate solution, 0.5 to 3.0 percent stearic acid, 0.1 to 2.0 percent activated carbon and 0 to 10 percent barium hydrate, which process comprises drying said mixture to a moisture content of less than 1 percent and bringing it to an elevated temperature in the range of 80° C. to 110° C. and then compressing said mixture under pressure sufficient to form stable briquets while said mixture is maintained at a temperature of 80° C. to 110° C.

3. The process of making desalting briquets from a mixture of granulated components consisting of 85 to 99.4 percent cation exchange material in the silver form which in turn consists of 30 to 99.5 percent silver alumino silicate and 0.5 to 70 percent water insoluble silver cation exchange resin selected from the group consisting of sulfonated styrene-divinyl copolymer, phosphonated styrene-divinyl copolymer, phenol formaldehyde copolymer, and a carboxylic type copolymer prepared from acrylics and divinyl benzene, each treated with silver nitrate solution, 0.5 to 3.0 percent stearic acid, 0.1 to 2.0 percent activated carbon and 0 to 10 percent barium hydrate, which process comprises drying said mixture and bringing it to an elevated temperature of about 100° C. until its moisture content has been reduced to less than 1 percent and then compressing said mixture under pressure sufficient to form stable briquets while said mixture is maintained at a temperature of 70° C. to 110° C.

References Cited by the Examiner

UNITED STATES PATENTS

| 2,494,784 | 1/1950 | Tiger | 252—179 X |
| 2,600,719 | 1/1952 | Wood | 252—179 X |

LEON D. ROSDOL, *Primary Examiner.*

JULIUS GREENWALD, *Examiner.*

W. E. SCHULZ, *Assistant Examiner.*

UNITED STATES PATENT OFFICE
CERTIFICATE OF CORRECTION

Patent No. 3,284,366                                                 November 8, 1966

Calvin Calmon et al.

It is hereby certified that error appears in the above numbered patent requiring correction and that the said Letters Patent should read as corrected below.

Column 1, line 29, after "phenol" strike out the comma; column 5, line 39, after "aging," insert -- and --; line 68, after "occupying" insert -- a --.

Signed and sealed this 5th day of September 1967.

(SEAL)
Attest:

ERNEST W. SWIDER                                      EDWARD J. BRENNER
Attesting Officer                                               Commissioner of Patents